(12) United States Patent
Darrell

(10) Patent No.: US 6,356,669 B1
(45) Date of Patent: Mar. 12, 2002

(54) EXAMPLE-BASED IMAGE SYNTHESIS SUITABLE FOR ARTICULATED FIGURES

(75) Inventor: Trevor Darrell, San Francisco, CA (US)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/318,790

(22) Filed: May 26, 1999

Related U.S. Application Data

(60) Provisional application No. 60/086,642, filed on May 26, 1998.

(51) Int. Cl.$^7$ .................................................. G06K 9/32

(52) U.S. Cl. ...................... 382/294; 382/284; 382/287; 382/300; 345/629; 358/450

(58) Field of Search ................................. 382/300, 284, 382/274, 309, 151, 282, 294, 287; 345/629; 358/456, 448

(56) References Cited

U.S. PATENT DOCUMENTS

| 5,325,475 A | 6/1994 | Poggio et al. |
| 5,416,899 A | 5/1995 | Poggio et al. |
| 5,745,668 A | 4/1998 | Poggio et al. |
| 5,774,129 A | 6/1998 | Poggio et al. |

*Primary Examiner*—Bhavesh Mehta
*Assistant Examiner*—Yosef Kassa
(74) *Attorney, Agent, or Firm*—Burns, Doane, Swecker & Mathis, L.L.P.

(57) ABSTRACT

Image-based synthesis for non-rigid bodies whose appearances do not form a linear manifold is carried out by representing mappings from control parameters to appearances as subsets of piecewise smooth functions. Each subset contains example images which are well approximated by particular examples which lie on the convex hull of the subset's parameter values. Once the subsets of examples are defined, interpolation is performed by using only the examples in a single subset. To provide for efficient operation, image transforms based upon radial cumulative similarities are used to automatically estimate the correspondence between example images.

27 Claims, 4 Drawing Sheets

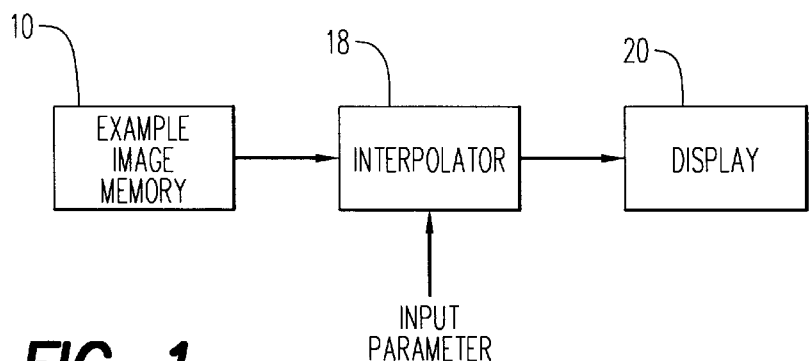
FIG. 1
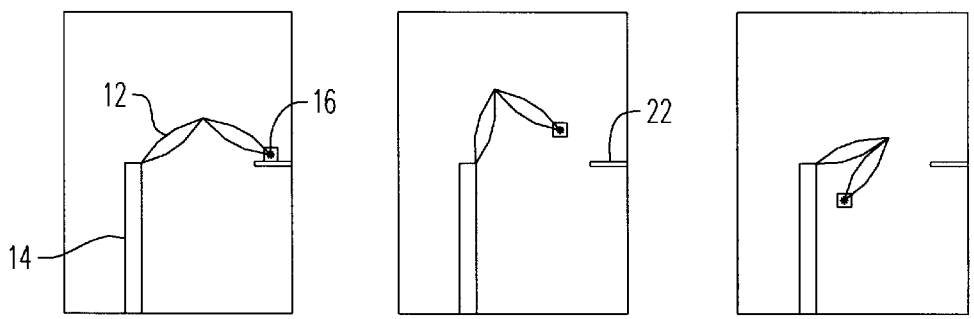
FIG. 2a   FIG. 2b   FIG. 2c
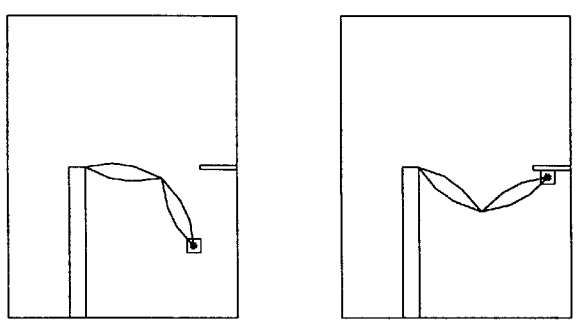
FIG. 2d   FIG. 2e

EXAMPLE-BASED IMAGE SYNTHESIS SUITABLE FOR ARTICULATED FIGURES

This application claims priority under 35 U.S.C. §§119 and/or 365 to 60/086,642 filed in United States of America on May 26, 1998; the entire content of which is hereby incorporated by reference.

FIELD OF THE INVENTION

The present invention is generally directed to computer graphics, and more particularly to image-based rendering of figures, by interpolating exemplary images of those figures.

BACKGROUND OF THE INVENTION

In the field of computer vision, two basic approaches have been employed to render, or synthesize, an image of an object or figure. One approach employs a geometric model of the object, which defines the underlying structure and/or behavior of the object. Once the model is known, it can be used to render an image of the object from any desired perspective. In many cases, however, a geometric model is not available for the desired object. In these cases, image-based rendering may be employed. Generally, image-based rendering involves the creation of a new image from a set of example images. In one approach, a number of exemplary images are obtained of the object in different poses or configurations, and point correspondence is established between the various images. Based upon this information, the data within the exemplary images is interpolated to produce a new image which illustrates the object in a designated pose or configuration.

The types of objects that can be synthesized by means of image-based rendering can be classified as either rigid or non-rigid. To date, much of the attention that has been given to the problem of image synthesis has been directed to rigid object transformation. Examples of the various solutions that have been proposed for this category of image synthesis include view morphing, plenoptic modeling with depth recovery, lightfields, and the use of trifocal tensors. In general, these techniques function to extrapolate the perspective geometry of a rigid object, to present a desired view.

Such techniques are not readily applicable to non-rigid objects which are capable of different configurations, such as a face which can have different expressions or a human body which can assume a variety of different configurations. For these types of subjects, more general image interpolation techniques have been employed. For example, techniques which are based on Radial Basis Functions or on Principle Components Analysis have been used to interpolate face images under varying pose, expression and identity conditions. Further information regarding these techniques can be found in the following publications: Beymer et al, "Example Based Image Analysis and Synthesis," *MIT AI Lab Memo No. 1431*, MIT, 1993; Beymer et al, *Science*, 272:1905–1909, 1996; Jones et al, "Multi-Dimensional Morphable Models," *Proc. ICCV*:98, Bombay, India, pp. 683–688, 1998; and Lanitis et al, "A Unified Approach To Coding and Interpreting Face Images," *Proc. ICCV*-95, pp. 368–373, Cambridge, Mass., 1995, the disclosures of which are incorporated herein by reference. Unfortunately, these methods are limited in the types of object appearance that can be accurately portrayed. For instance, face analysis which employs Principle Components Analysis techniques typically assumes that images of face shape and texture fall within a linear subspace, and does not work in complex situations such as the different possible configurations for a human limb, or the like. Radial Basis Functions operate on the assumption that a smooth function is being modeled. They are not applicable to situations in which the data does not conform to a function, such as views in which a single control point location might be applicable to multiple different views.

It is desirable to be able to extend non-rigid image synthesis to those situations where the appearance of the object to be rendered is not a linear manifold nor a smooth function. One example of an object which falls into this category is an articulated body. The mapping from a control parameter to an associated appearance for articulated bodies is often one-to-many, due to the multiple configurations that are possible for a particular location for an end point of the body. Furthermore, the mapping will be discontinuous when constraints are present that require different solutions across a boundary in parameter space.

SUMMARY OF THE INVENTION

In accordance with the present invention, image-based synthesis for nonrigid bodies whose appearances do not form a linear manifold is carried out by representing mappings from control parameters to appearances as subsets of piecewise smooth functions. Each subset contains example images which are well approximated by particular examples which lie on the convex hull of the subset's parameter values. Once the subsets of examples are defined, interpolation is performed by using only the examples in a single subset.

By means of this approach, inconsistent example images are not combined during interpolation. Furthermore, the number of examples that are needed to fully interpolate a function is reduced, since only those examples which lie on the convex hull of an example subset need to be used. Any new example that falls within, and is well approximated by, the convex hull of an existing subset can be ignored during the interpolation process.

To provide for efficient operation of an image-based rendering technique, a method for automatically estimating the correspondence between images is preferably employed. Typically, optic-flow based methods are used for this purpose. However, articulated bodies are particularly difficult to analyze with such techniques. For instance, images of limbs with uniform clothing or skin color can be difficult to track by means of methods which require contrast to be present in the foreground of an image feature. In one embodiment of the invention, the contour of an articulated body can be tracked by means of an image transform which employs radial cumulative similarities, of the type disclosed in copending application Ser. No. 199,799, to find correspondences for rendering human figures in realistic imagery.

The features of the invention, and the advantages offered thereby, are explained in greater detail hereinafter with reference to particular examples that are described with the aid of the accompanying figures.

BRIEF DESCRIPTION OF THE DRAWINGS

FIG. 1 is a block diagram of a system of a type in which the present invention can be implemented;

FIGS. 2a–2e illustrate example images of an articulated arm;

DETAILED DESCRIPTION

Figure 3:
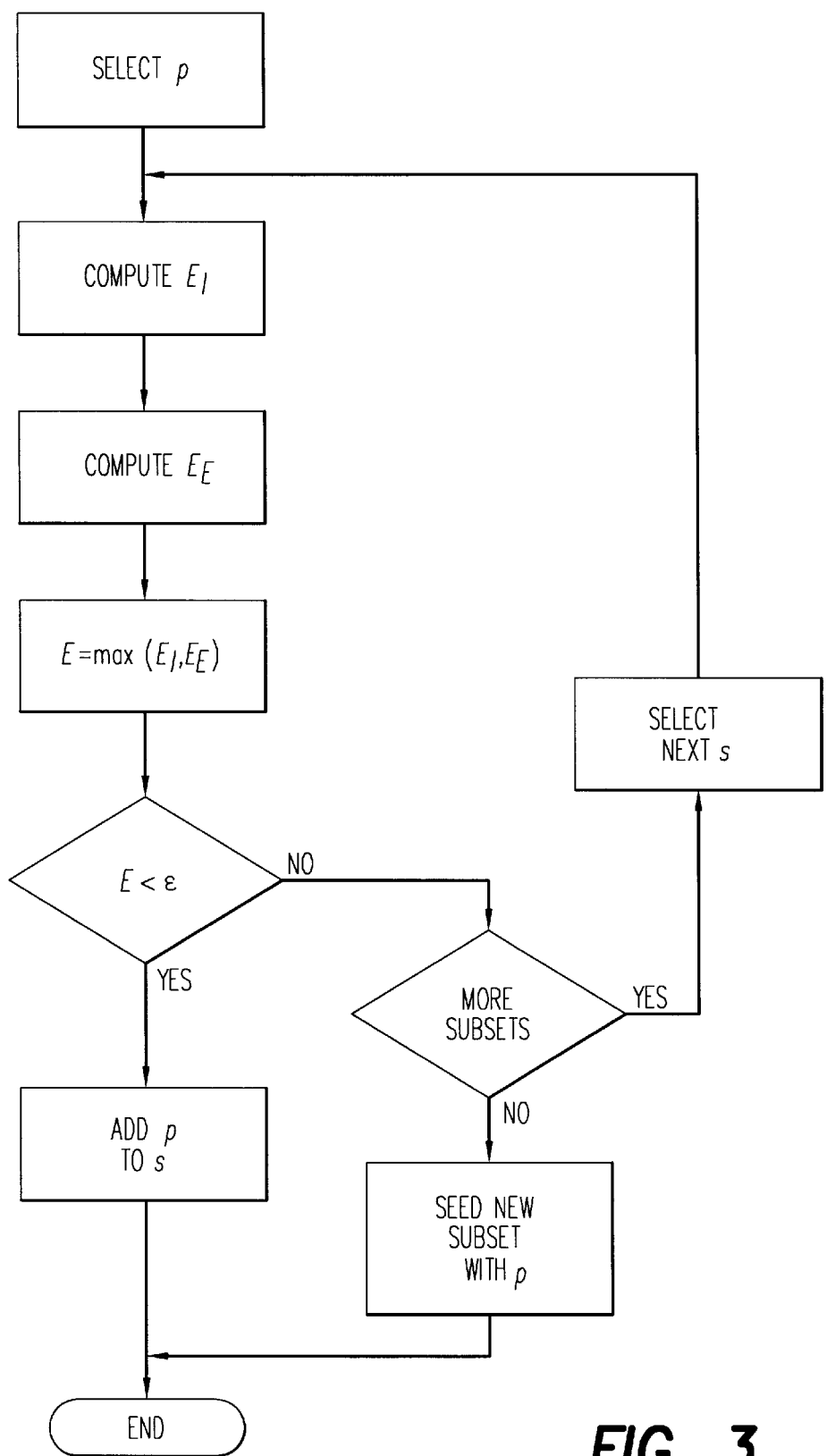
FIG. 3 is a flowchart of the procedure for grouping examples into subsets.

A general overview of an image-based rendering system in which the present invention might be implemented is illustrated in FIG. 1. A memory 10 stores a number of example images that correspond to a given image that is to be synthesized. The images which are stored in the memory 10 constitute a limited number of examples, rather than all possible solutions within the spectrum of images to be synthesized. A representative collection of example images that might be stored in the memory is illustrated in FIGS. 2a–2e. These images depict different appearances for an articulated arm 12 having one end thereof mounted on a fixed post 14. The other end of the arm has two degrees of freedom in an X-Y plane, and forms a control point 16 of interest. The parameter space for these examples comprises all of the possible positions for the control point, and the corresponding appearance space contains all of the possible configurations for the arm.

Referring again to FIG. 1, example images stored in the memory 10 are provided to an interpolator 18. The interpolator can be implemented in a suitably programmed computer, for example. In addition to the example images, the interpolator receives input parameters which determine an image to be synthesized. In the case of the images illustrated in FIGS. 2a–2e, for instance, the input parameter comprises the x and y coordinates of the control point, i.e., a desired position for the free end of the arm. Given this input parameter, the interpolator 18 interpolates example images stored in the memory 10 to generate an image of the arm in which the control point is positioned at the designated location. This image is then displayed on a suitable display device 20, such as a computer monitor.

Within the interpolator 18, traditional interpolation networks can be employed when the appearance of the object can be characterized either as a linear manifold or as a smooth function over the parameter of interest. For instance, both Principal Components Analysis (PCA) and Radial Basis Functions (RBF) techniques have been employed for modeling facial expressions. Both of these approaches rely upon the coupling of shape and texture (e.g. intensities and/or colors) into a single representation, to model non-rigid shape appearance from examples. The interpolation of shape by itself has been well developed, but is not sufficient to render realistic images. Conversely, PCA and RBF models of images that do not have a corresponding shape model are only able to interpolate the images within a very limited range of poses or configurations.

In a coupled representation, texture is modeled in shape-normalized coordinates, and shape is modeled as disparities between examples, or displacement from a canonical example to individual examples. Image warping is used to generate images for a particular texture and shape. Given a training set $\Omega = \{(y_i, x_i, d_i), 0 \leq i \leq n\}$ where $y_i$ is the image of example $i$, $x_i$ is the associated pose or configuration parameter, and $d_i$ is a dense correspondence map relative to a canonical pose, a set of shape-aligned texture images can be computed such that texture $t_i$ warped with displacement $d_i$ renders example image $y_i$, i.e. $y_i = t_i \circ d_i$. For further information in this regard, reference is made to the previously cited publications by Beymer et al, Jones et al and Lanitis et al. A new image is constructed using a coupled shape model G and texture model F, based on input u:

$$\hat{y}(\Omega, u) = F_T(G_D(u), u),$$

where D and T are the matrices $[d_0 d_1 \ldots d_n]$ and $[t_0 t_1 \ldots t_n]$, respectively.

In PCA-based approaches, the function G projects a portion of u onto an optimal linear subspace found from the matrix D, and the function F projects a portion of u onto a subspace found from the matrix T. For example, $G_D(u) = P_D^m S_g u$, where $S_g$ is a diagonal boolean matrix which selects the texture parameters from u and $P_D^m$ is a matrix containing the m-th largest principle components of D. The function F warps the reconstructed texture according to the given shape: $F_T(u,s) = [P_T^m S_t u] \circ s$. While interpolation can be straight-forward using a PCA approach, the parameters used in PCA models often do not have any direct physical interpretation. For the task of view synthesis, an additional mapping $u = H(x)$ is needed to map from task parameters to PCA input values.

The RBF-based approach can also be easily applied to view synthesis. In this approach, both of the functions G and F are networks which compute locally-weighted regression, and parameters are used directly (u=x). The function G computes an interpolated shape, and the function F warps and blends the example texture images according to that shape:

$$G_D(x) = \Sigma_i c_i f(x - x_i), \quad F_T(x,s) = [\Sigma_i c_i' f(x - x_i)] \circ s,$$

where f is a radial basis function. The coefficients c and c' are derived from D and T, respectively: $C = DR^+$, where $r_{ij} = f(x_i - x_j)$ and C is the matrix of row vectors $c_i$; similarly $C' = TR^+$. Both vector norm and Gaussian basis functions give good results when appearance data is from a smooth function.

However, when the image data is not a proper function, for instance when the mapping from parameter space to appearance space is not one-to-one, the traditional approaches based on PCA and RBF no longer produce acceptable results. The articulated arm presents a good illustration of this problem. For many of the possible positions of the arm's end point, different configurations are possible, e.g. joint down or joint up. In addition, the examples of FIGS. 2a–2e illustrate a boundary that is present in the parameter space, namely an obstruction 22 in the path of the arm 12. This obstruction presents a discontinuity in the appearance space. In particular, FIGS. 2a and 2e are close to one another in parameter space, since the control point 16 at the end of the arm occupies nearly the same position in both views. However, because of the discontinuity, the two images are quite distant from one another in appearance space, since it is not possible to go from one image to the other by simple translation. This type of constraint presents difficulties for synthesis algorithms that attempt to employ all of the example images to interpolate a new appearance.

In accordance with the present invention, this problem is addressed by dividing the image data into subsets that individually behave as functions. Given examples from a complicated (non-linear, nonsmooth) appearance mapping, local regions of appearance which are well-behaved as smooth, possibly linear, functions are defined. The examples are clustered into subsets which can be individually used for successful interpolation. For instance, either of the previously described approaches based on PCA or RBF can be used to interpolate the example images within a subset. For ease of illustration, embodiments of the invention will be described hereinafter with reference to RBF-based view synthesis techniques. It will be appreciated, however, that PCA-based approaches are equally applicable.

In the past, a similar type of data grouping problem has been addressed by using K-means clustering of image appearance to form the initial groupings for PCA analysis. Such an approach is described, for example, in Bregler et al, "Nonlinear Image Interpolation Using Manifold Learning," NIPS-7, MIT Press, 1995. However this approach has no texture model, and performs clustering using a mean-squared-error distance metric in simple appearance. Simple appearance clustering drastically over-partitions the appearance space compared to a model that jointly represent shape and texture. Examples which are distant in simple appearance can often be close when considered in 'vectorized' representation, as depicted in the examples of FIGS. 2a–2e. The present invention extends the concept of example clustering to the case of coupled shape and texture appearance models.

The basic method of the present invention defines subsets of examples which can be well-approximated from their convex hull in parameter space. The convex hull of a set of data points is the smallest subset of points on the periphery of the set which encompasses all of the data points in parameter space. Examples of known algorithms that can be employed to find the convex hull of a set of data points include Incremental, Gift Wrap, Divide and Conquer, and QuickHull. A set growing criterion is used to enforce compactness and good interpolation properties. Specifically, to add a new point to an example subset, the new point must be well approximated by the previous subset alone, and all interior points in the resulting subset must be well interpolated from the exterior examples. Exterior examples are those on the convex hull of the set in parameter space.

The procedure for establishing the subsets is depicted in the flowchart of FIG. 3. Given a training subset s of example images which are selected from the set $\Omega$ of all example images, the objective is to determine whether a new point, $p \in \Omega$, should be included in the subset s.

To do so, an image is generated by interpolating the example images which are already in the subset s, using the point p as an input parameter. The interpolation can be carried out by means of the RBF or PCA techniques discussed previously, for example. A determination is made how well the image associated with the point p can be interpolated from the example images of the subset. This determination is made by computing an interior error $$E_I(s) = \max_{p \in (s - \mathcal{H}_x(s))} \|y_p - \hat{y}(\mathcal{H}_x(s), x_p)\|$$

and an extrapolation error $$E_E(s,p) = \|y_p - \hat{y}(\mathcal{H}_x(s), x_p)\|$$

for the interpolated image, where $\mathcal{H}_x(s)$ is the subset of s whose parameter vectors lie on the convex hull of all such vectors in s. The interior error value indicates the differences between the interpolated image $y_p$ associated with the point p and other images whose parameter vectors lie within the convex hull of the subset s. The extrapolation error indicates the differences between the image $y_p$ and the images whose parameter vectors lie on the convex hull of the subset. These differences might be measured in terms of the intensity values of pixels in the respective images, or any other suitable parameter. The interior error assures compactness of each subset, and the exterior error provides interpolation constraints.

The assigned error value for the point p relative to the subset s is then taken as the maximum of the interior error and the extrapolation error:

$$E(s,p) = \max(E_I(s \cup \{p\}), E_E(s,p)).$$

To add the new point p to the subset s, the condition $E(s,p) < \epsilon$ must be satisfied, where $\epsilon$ is a parameter whose value can be arbitrarily selected. If it does not meet this criterion, the data point p is evaluated in a similar manner against other subsets, or used as the basis of a new subset.

This procedure is carried out by starting with a subset of seed examples, which may consist of as few as one example image, e.g. the image of FIG. 2a. Given a seed example set, nearest neighbors in appearance space may be examined to find the next candidate to add, or candidates may be selected randomly, or via another heuristic process. For instance, it is possible to rely on precomputed non-vectorized appearance distance (e.g., mean squared error between example images) to locate suitable candidates.

Figure 4A:
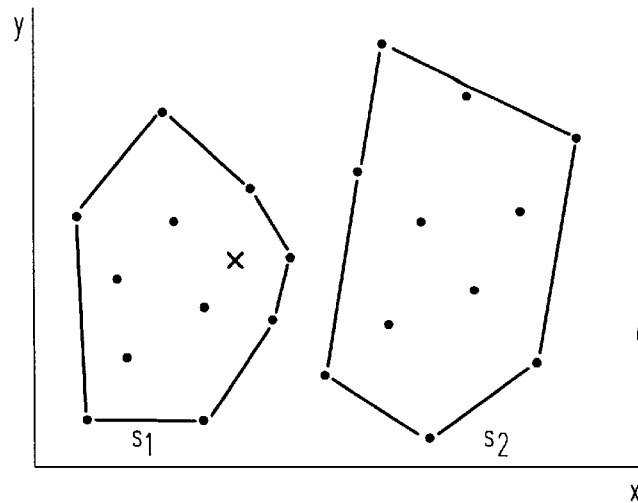
FIGS. 4a–4c illustrate examples of set groupings.
Figure 4B:
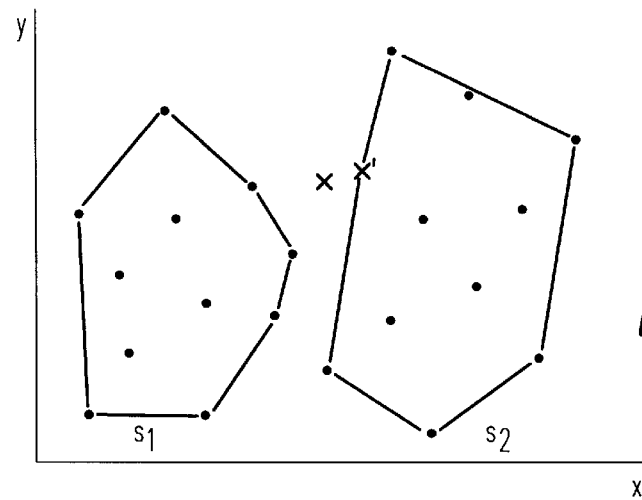
Figure 4C:
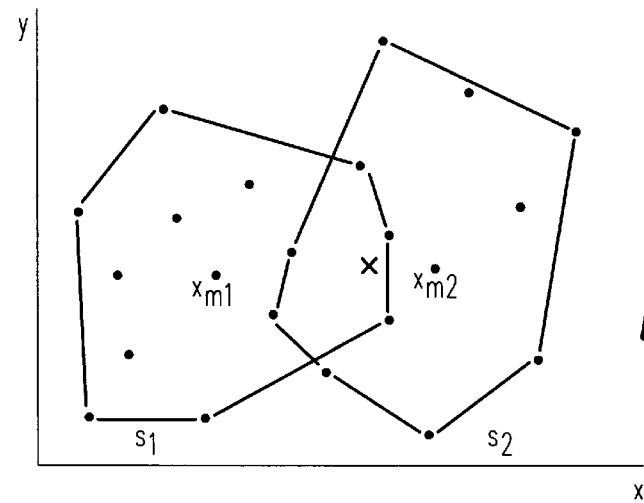

If examples are provided in sequence and are based on observations from an object with realistic dynamics, effective groupings can be defined even if observations are sparse in appearance space. For instance, representative frames can be selected from a video sequence depicting an object moving among its various configurations or poses. In this situation, the example grouping approach is based on the assumption that, along the trajectory of example observations over time, the underlying object is likely to remain smooth and locally span regions of appearance which are possible to interpolate. Set growth is performed along examples on their input trajectory, e.g. the sequential ordering of video frames. For instance, K seed points can be selected on the trajectory to form initial clusters. At each point p, the set s is identified which is the smallest interval on the example trajectory which contains p, has a non-zero interior region $(s - \mathcal{H}_x(s))$, and for which $E_I(s) < \epsilon$. If such set exists, it continues to be expanded, growing along the example trajectory until the set-growing criterion is violated. Once a subset can no longer be grown, it is tested to see whether it is a proper subset of another, and it if so it is deleted. The remaining sets are maintained, and used for interpolation as described hereinafter. FIGS. 4a–4c illustrate examples in which the parameter values p of all example images have been grouped into two subsets $s_1$ and $s_2$. The convex hull of each set is depicted by the lines defining its periphery.

As a further feature of the invention, empirical cross-validation may be employed to confirm that the members of a subset are properly contained in that subset. If the subset is proper, it should be possible to reconstruct any known member of the subset from the other members of the subset. Therefore, after a subset is established, its members are tested one at a time, by inputting the parameter vector for one member and attempting to synthesize an image from all of the other example images of the subset. If the correct image is synthesized, the tested image's membership in the subset is valid. If the image cannot be synthesized in this manner, it is removed from the subset.

Once the subsets have been defined according to the foregoing procedure, new views are generated using sets of examples. Pursuant to the invention, interpolation is restricted to only occur inside the convex hull of an example set for which $E_I(s) \leq \epsilon$. Given a new parameter vector x, it is tested to see whether it is within in the convex hull of parameters in any example set. Referring to FIG. 4a, the new data point x is contained within the convex hull of subset $s_1$, and so the example images of that set are used to perform the interpolation. In the situation of FIG. 4b, the data point x does not lie within the convex hull of any example set. In this case, the nearest point x' on the convex hull of one of the example sets is used instead. This constraint prevents erroneous extrapolation of the example images.

If a new parameter is within the convex hull of more than one example set, as shown in FIG. 4c, the set is selected whose median example parameter is closest to the desired example parameter. In the situation depicted in FIG. 4c, the new parameter x is closer to the median parameter $x_{m2}$ than it is to the parameter $x_{m1}$. Therefore, the examples in the subset $s_2$ are used for interpolation. Once a subset has been selected, a new function value is interpolated from example images, for example by using the RBF method summarized above. As a further feature, only the example images on the convex hull of the chosen subset are employed, to minimize the amount of data to be processed during interpolation.

To enforce temporal consistency of rendered images over time, a simple additional constraint can be imposed on subsequent frames. Once an example set has been selected, it continues to be used until the desired parameter value leaves the valid region (convex hull) of that set. When this occurs, only transitions to "adjacent" example sets are permitted; adjacency is defined as those pairs of sets for which at least one example on each convex hull are sufficiently close ($\|y_i - y_j\| < \epsilon$) in appearance space.

Figure 5E:
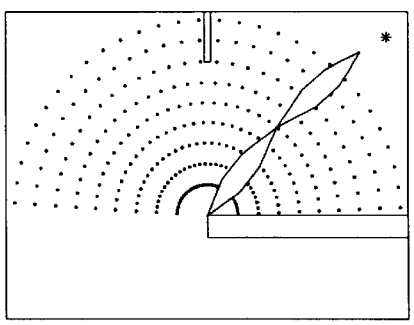
FIGS. 5a–5e illustrate interpolation results that are obtained with conventional procedures.
Figure 5D:
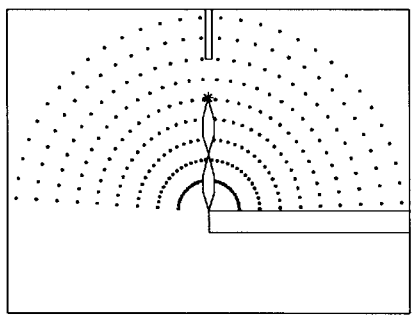
Figure 6D:
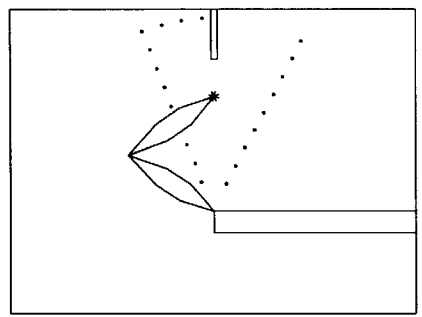
Figure 5C:
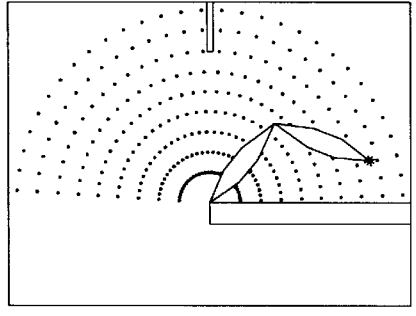
Figure 6C:
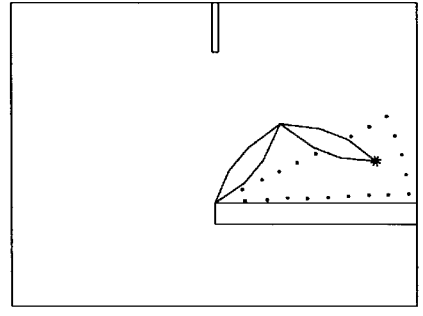
Figure 5B:
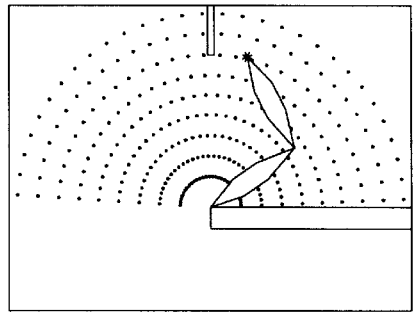
Figure 6B:
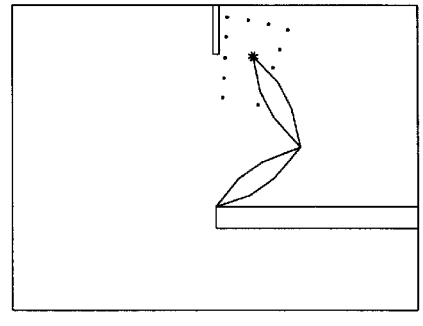
Figure 5A:
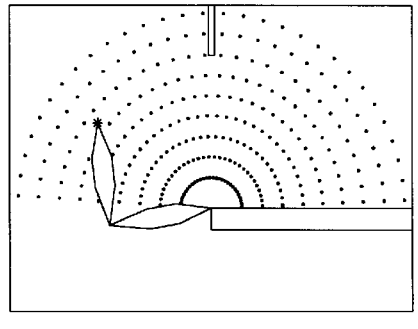
Figure 6A:
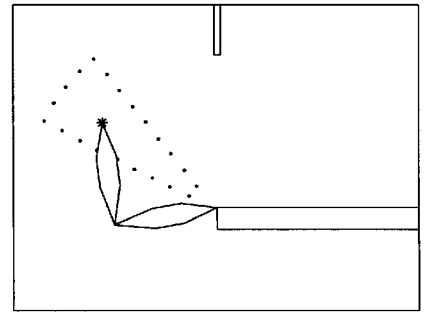

The improved results that are obtained by means of the present invention can be seen in the images of FIGS. 5a–5e and 6a–6e. FIGS. 5a–5e depict images that are synthesized when all of the example images in the set $\Omega$ are used for interpolation. The parameter space associated with all of these images is represented by the concentric arcs of data points, and the input parameter is represented by a star. It can be seen that FIGS. 5d and 5e depict improper images in which the structure of the arm is physically unrealistic. In the example of FIG. 5e, extrapolation outside of the known parameter values has resulted in an arm whose links are oversized.

Figure 6E:
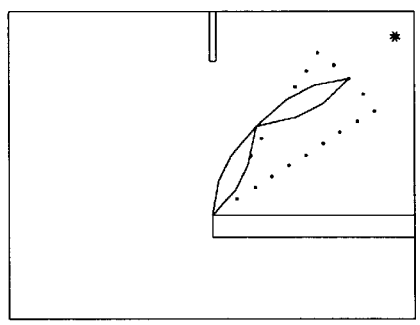
FIGS. 6a–6e illustrate interpolation results that are obtained in accordance with the present invention.

In FIGS. 6a–6e, the images have been synthesized for the same input parameter as FIGS. 5a–5e, respectively, but using only the example images in one subset. The parameter values for the convex hull of the selected subset are depicted in the synthesized images. By means of this approach, it can be seen that the arms depicted in all of the synthesized images have the proper appearance. Furthermore, FIG. 6e shows that, by inhibiting extrapolation beyond the convex hull of the chosen subset, the anomalous result of FIG. 5e is avoided.

A significant input to example-based image synthesis methods which operate on natural images is accurate image disparity, or correspondence. For each point on each example image, the equivalent location in a cannonical reference frame is computed to yield the matrix D described previously. To apply the foregoing procedure to real imagery, such as a video sequence of a human subject moving his arm to various positions, a method is needed to track the arm as it moves through the scene. Unfortunately, articulated figures pose a particular problem for known approaches to local feature tracking. When a figure has multiple moving segments and thus many occluding boundaries, it must have considerable contrast on each segment for conventional tracking techniques to succeed. Often this is not the case, such as when segments are skin or cloth of a uniform color.

A robust image transform that can be used to track occluding contours accurately in this context is described in copending application Ser. No. 199,799, entitled "Detection of Image Correspondence Using Radial Cumulative Similarity", the disclosure of which is incorporated herein by reference. A local representation of the shape of image attribute homogeneity is a stable feature at occluding boundaries. In this technique, similarity is computed by radially integrating the similarity of points in a window relative to the center. An interactive contour tracing system based on the radial cumulative similarity (RCS) feature tracking can be used to track an arm in a sequence of video images. A canonical contour is traced in the initial frame, and key points along that contour are tracked automatically in subsequent frames. If errors occur, they can be edited by the operator. The RCS-based method is able to follow an occluding contour of the limb where little or no foreground contrast is present.

In summary, view-based image interpolation is a useful paradigm for generating realistic imagery without full models of the underlying scene geometry. Current techniques for nonrigid interpolation assume appearance is a smooth function. Using example clustering and on-line cross validation, the present invention decomposes a complex appearance mapping into sets of examples which can be smoothly interpolated. Given images with various configuration conditions, and with associated parameter vectors marking control point locations, the invention is able to discover a small set of manifolds with a small number of exemplars. Each can render new examples which are always physically correct.

It will be appreciated by those of ordinary skill in the art that the present invention can be embodied in other specific forms without departing from the spirit or essential characteristics of the invention. For instance, while the examples of FIGS. 2, 5 and 6 have fixed appearances, the principles of the invention are also applicable to images which vary over time. In such a case, three-dimensional parameter vectors having a time component, as well as x and y coordinate components, might be used.

The foregoing examples are therefore considered to be merely illustrative of the principles of the invention, and should not be construed as limiting in any way. The scope of the invention is indicated by the following claims, rather than the foregoing description, and all changes that come within the meaning and range of equivalence thereof are intended to be embraced therein.

What is claimed is:

1. A method for synthesizing images, comprising the steps of:

storing a plurality of example images that correspond to an image to be synthesized, each of said example images having at least one control parameter associated therewith;

grouping said example images into a plurality of subsets, wherein each subset contains images which can be reconstructed from the convex hull of the associated control parameters for the images in the subset;

receiving a parameter value for a new image to be synthesized;

identifying one of said subsets having an associated parameter space which contains said parameter value; and interpolating only the example images of the identified subset to generate a synthesized image.

2. The method of claim 1 wherein said grouping is carried out by calculating an interior error value which indicates the differences between a given image and other images in a subset, and including said given image in the subset if the interior error is less than a predetermined value.

3. The method of claim 1 wherein said grouping is carried out by calculating an extrapolation error value which indicates the differences between a given image and images on the convex hull of a subset, and including said given image in the subset if the extrapolation error is less than a predetermined value.

4. The method of claim 1 wherein said grouping is carried out by calculating an interior error value which indicates the differences between a given image and other images in a subset, and an extrapolation error value which indicates the differences between said given image and images on the convex hull of a subset, and including said given image in the subset if the maximum of said interior error and said extrapolation error is less than a predetermined value.

5. The method of claim 1 further including the step of cross-validating the members of a subset by specifying the control parameter of one example image of the subset and interpolating the other example images of the subset in an attempt to synthesize said one example image.

6. The method of claim 1 further including the step of inhibiting the synthesis of images whose parameter values lie outside of the convex hulls of all of said subsets.

7. The method of claim 6 wherein, if the received parameter value is not contained in the parameter space of any of said subsets, an image is synthesized on the basis of an example image which is on the convex hull of one of the subsets and which is closest to said parameter value.

8. The method of claim 1 wherein, if the generated parameter value is contained in the parameter space of two or more of said subsets, the subset having a median image whose control parameter is closest to said parameter value is selected for interpolation.

9. The method of claim 1 wherein said interpolation step is performed by means of an interpolation technique which employs an image model.

10. The method of claim 9 wherein said interpolation technique is based upon radial basis functions.

11. The method of claim 9 wherein said interpolation technique is based upon principal components analysis.

12. The method of claim 9 wherein said image model comprises the intensity values of an image.

13. The method of claim 9 wherein said image model comprises a coupled model having one term which describes an object's shape and another term which describes the object's texture.

14. The method of claim 9 wherein said grouping step is carried out by selecting a subset of example images, synthesizing an image for a given input parameter by interpolating images from the selected subset, determining differences between the synthesized image and the example images of the selected subset, and including the synthesized image as a member of the selected subset if said differences are less than a predetermined value.

15. A system for rendering images, comprising:
a memory storing a plurality of example images each having at least one control parameter associated therewith, said example images being grouped into a plurality of subsets, wherein each subset contains images which can be reconstructed from the convex hull of the associated control parameters for the images in the subset;
an interpolator which interpolates only the example images of one of said subsets that has an associated parameter space containing a parameter value specifing a new image to be synthesized, to generate a synthesized image; and
a display device which displays the synthesized image.

16. The system of claim 15 wherein said example images are grouped into subsets by calculating an interior error value which indicates the differences between a given image and other images in a subset, and including said given image in the subset if the interior error is less than a predetermined value.

17. The system of claim 15 wherein example images are grouped into subsets by calculating an extrapolation error value which indicates the differences between a given image and images on the convex hull of a subset, and including said given image in the subset if the extrapolation error is less than a predetermined value.

18. The system of claim 15 wherein said example images are grouped into subsets by calculating an interior error value which indicates the differences between a given image and other images in a subset, and an extrapolation error value which indicates the differences between said given image and images on the convex hull of a subset, and including said given image in the subset if the maximum of said interior error and said extrapolation error is less than a predetermined value.

19. The system of claim 15 wherein said interpolator inhibits the synthesis of images whose parameter values lie outside of the convex hulls of all of said subsets.

20. The system of claim 19 wherein, if said parameter value is not contained in the parameter space of any of said subsets, said interpolator synthesizes an image on the basis of an example image which is on the convex hull of one of the subsets and which is closest to said parameter value.

21. The system of claim 15 wherein, if said parameter value is contained in the parameter space of two or more of said subsets, said interpolator synthesizes the image from the subset having a median image whose control parameter is closest to said parameter value.

22. The system of claim 15 wherein said interpolator synthesizes an image by using interpolation technique which employs an image model.

23. The system of claim 22 wherein said interpolation technique is based upon radial basis functions.

24. The system of claim 22 wherein said interpolation technique is based upon principal components analysis.

25. The system of claim 22 wherein said image model comprises the intensity values of an image.

26. The system of claim 22 wherein said image model comprises a coupled model having one term which describes an object's shape and another term which describes the object's texture.

27. A computer-readable medium containing a program which executes the steps of:
grouping example images into a plurality of subsets, wherein each subset contains images which can be reconstructed from the convex hull of control parameters respectively associated with the images in the subset;
identifying one of said subsets having an associated parameter space which contains a parameter value specifying a new image to be synthesized; and
interpolating only the example images of the identified subset to generate a synthesized image.

* * * * *